UNITED STATES PATENT OFFICE.

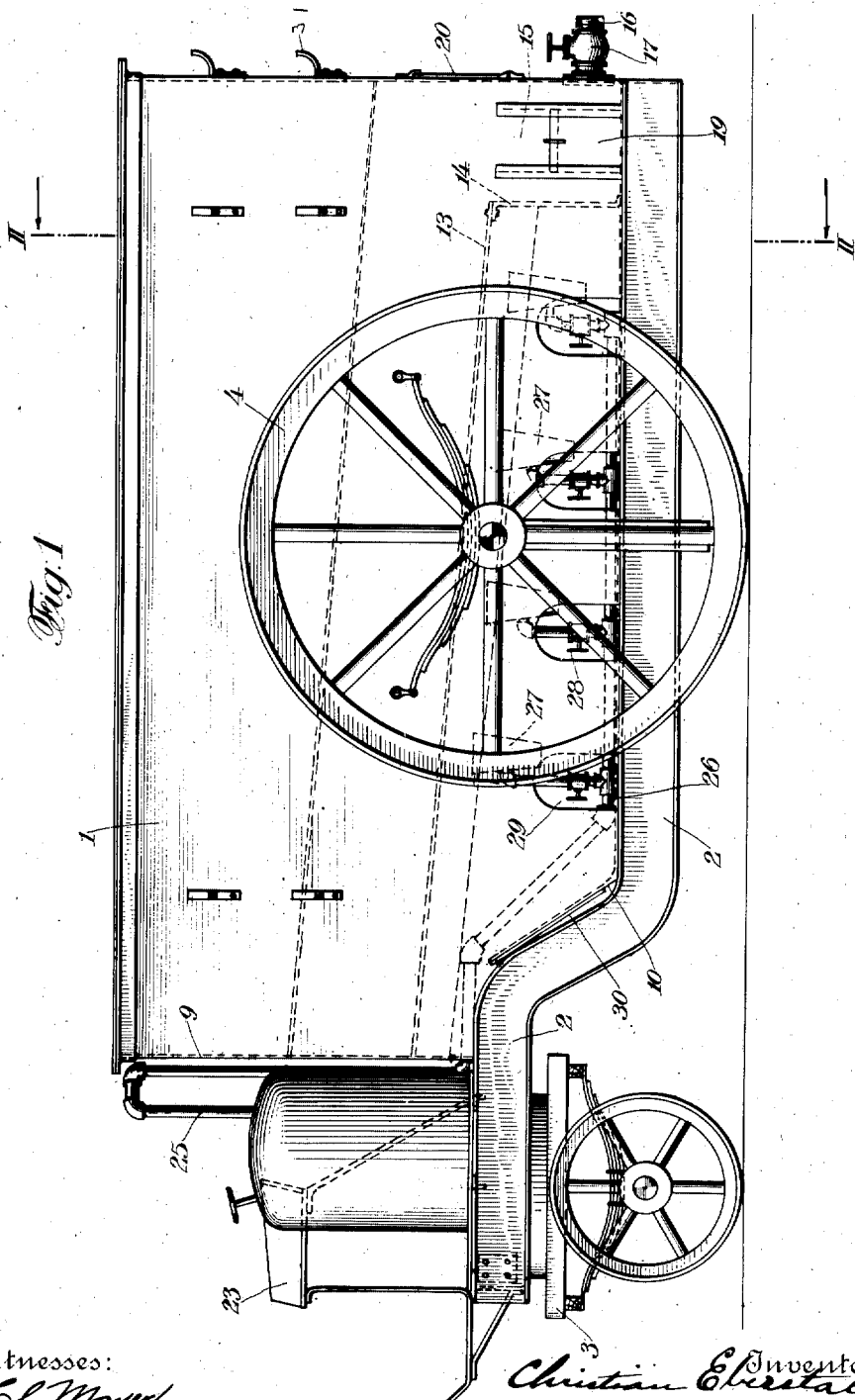

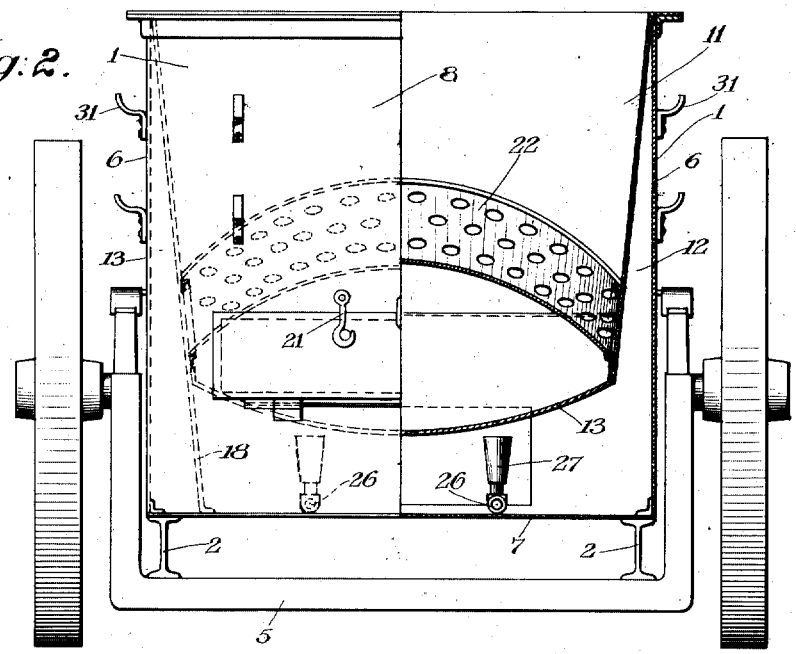
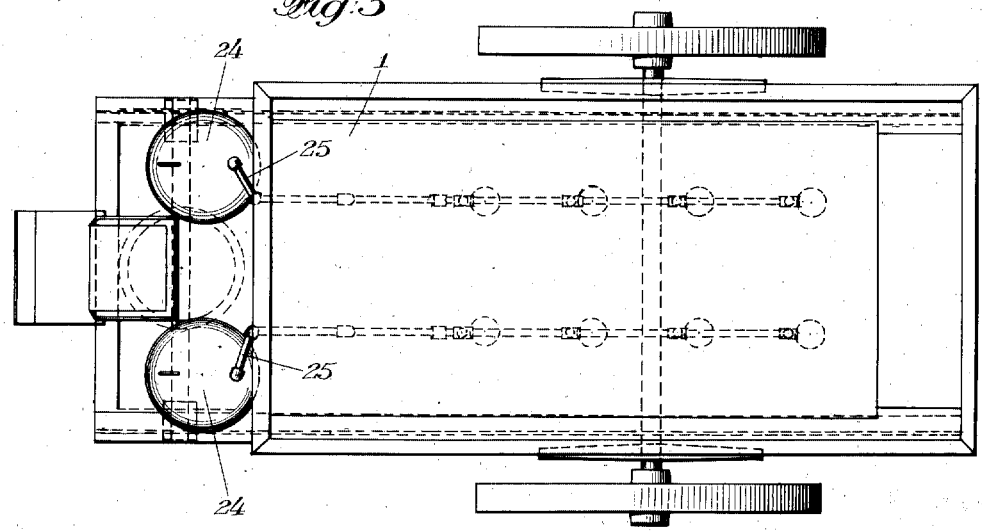

CHRISTIAN EBERSTALLER, OF ROSELLE, NEW JERSEY.

SNOW-MELTER.

994,579.  Specification of Letters Patent.  Patented June 6, 1911.

Application filed April 26, 1910. Serial No. 557,748.

*To all whom it may concern:*

Be it known that I, CHRISTIAN EBERSTALLER, a citizen of the United States, and a resident of Roselle, county of Union, and State of New Jersey, have invented certain new and useful Improvements in Snow-Melters, of which the following is a full, clear, and exact description.

The main object of this invention is to provide a durable and efficient apparatus, mounted on transporting wheels, by means of which snow may be melted and the resulting water run through a suitable hose connection to a sewer or other water outlet.

Another object of the invention is to so construct the apparatus as to prevent stones and other large substances clogging the water outlet.

Another object of the invention is to provide a simple and efficient heating means and to so locate said heating means that it will be protected and yet will be readily accessible for the purposes of repair or renewal.

A further object of the invention is to so construct the apparatus that it may be used as a road-sprinkling cart.

With these and other objects in view, the invention will be hereinafter more particularly described with reference to the accompanying drawings, which form a part of this specification, and will then be pointed out in the claims at the end of the description.

Figure 1 is a side elevation of the apparatus; Fig. 2 a rear elevation, a portion of the apparatus in vertical transverse sectional view, said section being on the line II—II of Fig. 1; and Fig. 3 a plan view of the apparatus.

Referring to the various parts by numerals, 1 designates the main body of the cart which is supported on longitudinally extending I-beams 2, the forward ends of said beams being bent upwardly and then horizontally to adapt them to be supported upon the forward transporting wheels, these latter wheels being carried by a suitable turning truck 3. The main transporting wheels 4 are connected by means of a drop axle 5 on the main horizontal portion of which the I-beams 2 rest, as shown clearly in Fig. 2.

The main outer receptacle or body of the cart consists of the sides 6, the bottom 7, the rear wall 8, a suitable front wall 9, and the inclined wall 10 near the forward end of the cart body. Suspended within the main body of the cart is an inner supplemental snow and water receiving receptacle 11. This receptacle is open at its upper end and is suspended from the upper edge of the main body of the cart. It will, of course, be suitably supported and braced within the cart, as is manifest. This supplemental water and snow receiving body is tapered from its upper to its lower end to form the spaces 12 between the sides thereof and the outer sides of the main body of the cart. The bottom 13 of the supplemental receptacle is dished or concave, as clearly shown in Fig. 2 and is arranged a suitable distance above the bottom of the main part of the cart. This bottom inclines from its rear end upwardly to the front wall of the cart as indicated clearly in dotted lines in Fig. 1, and said bottom terminates short of the rear wall of the main body of the cart, said rear end of the bottom being supported by a transverse wall 14, this wall resting on the bottom of the main body of the cart. By this means a well or depressed part 15 is provided at the rear end of the cart into which the water resulting from melting the snow will run. Connected to this well is an outlet pipe 16, said pipe being provided with a suitable controlling valve 17. The side walls of the supplemental receptacle extend from the front wall of the main body of the cart to the rear wall thereof, and beyond the vertical wall 14 they extend to the bottom of the cart, as indicated at 18 in Fig. 2, so that said side walls together with the wall 14 and the rear wall of the main body of the cart form the well 15. To remove from this well the dirt and mud which will accumulate therein, a sliding door 19 is provided in the side of the main body of the cart, a corresponding door being formed in the adjacent side wall 18 of the well, so that by raising said doors, the accumulated sludge in the well 15 may be removed.

In order to give access to the interior of the snow receiving receptacle, a door 20 is provided in the rear wall of the cart, said door being held closed by suitable clamps 21. This door is approximately on a level with the rear end of the bottom of the snow receiving receptacle so that any suitable form of cleaning implement may be inserted through said door for the purpose of cleaning said bottom 13.

To screen the material shoveled into the snow receiving receptacle, a perforated protecting plate 22 is secured within said receptacle, said screen extending from the front wall to the rear wall of the main receptacle and from side to side of the supplemental receptacle. This screen plate is convex on its upper surface and inclines downwardly from the front wall to the rear wall of the cart. The apertures in the said screen plate are of considerable size as it is only desired to keep large stones, sticks and other substances from accumulating on the bottom of the supplemental receptacle and the well 15. As the cart is open at the top this plate may be readily cleaned and the material held by it readily removed.

Supported in any convenient position on the cart, preferably near the driver's seat 23, are a pair of fuel tanks 24, the said tanks being preferably designed to hold kerosene, and each being provided with a suitable outlet pipe 25. These outlet pipes are each connected to a horizontal burner supply pipe 26 arranged along the bottom of and within the main body of the cart. Each of these burner supply pipes is connected to a series of burners 27, suitable valves 28 being provided to control the supply of fuel to said burners. As shown clearly in Figs. 2 and 3, these burners are arranged close to the bottom 13 of the supplemental receptacle. In the side walls of the main body of the cart, and adjoining each burner is a suitable opening 29 giving access to the valves 28 and forming an air inlet or supply for the burners. To give access to the burner compartment formed by the bottom of the supplemental receptacle and side walls and bottom of the main body of the cart, a door 30 is secured to the inclined wall 10, and is arranged to cover a large opening therein. Through this opening a workman may have access to the burner for the purpose of repair or removal, or to do such other work as cannot be done through the openings 29.

The main body of the cart is provided on its outer side with hose-supporting brackets 31. The outlet pipe 16 is threaded in order that a suitable hose or other pipe may be connected thereto for the purpose of either running the water resulting from the melting snow into a sewer or other outlet; or a suitable road sprinkling device may be connected thereto in order to adapt the apparatus for use as a road sprinkler.

From the foregoing, it is manifest that I provide a very simple and efficient apparatus capable of withstanding the hard usage to which an apparatus of this kind must necessarily be subjected. It is also manifest that I provide an apparatus which may be used not only for melting snow but as a road sprinkler. It is also to be noted that by suspending the snow receiving receptacle within the main receptacle spaces are provided around said snow receiving receptacle to retain the heat from the burners, thereby rendering the apparatus very efficient. It is also to be noted that the main body of the cart forms an outer protecting and heat retaining casing which practically surrounds the entire snow receiving receptacle. This is very important and adds greatly to the efficiency of the apparatus.

Having thus described my invention, I claim as new and desire to secure by Letters Patent:—

1. A snow melting apparatus comprising an outer main body or receptacle, an inner snow receiving receptacle of sufficiently less cross sectional area and less depth to provide lateral space and space below the bottom of said snow receiving receptacle, said inner receptacle having a depending extension forming a well below the plane of the bottom of said inner receptacle, at its rear end, and means for heating the bottom of said inner receptacle.

2. A snow melting apparatus comprising an outer main body or receptacle, an inner snow receiving receptacle of sufficiently less cross sectional area and less depth to provide lateral space and space below the bottom of said snow receiving receptacle, said inner receptacle having a depending extension forming a well below the plane of the bottom of said inner receptacle, at its rear end, a foraminous covering plate arranged within said inner receptacle and extending from the forward end thereof to the rear end of said outer or main body or receptacle, and means for heating the bottom of said inner receptacle.

3. A snow melting apparatus including an outer main body or receptacle, an inner snow receiving receptacle of sufficiently less cross sectional area and less depth to provide lateral space and space below the bottom of said inner receptacle, said inner receptacle terminating at its rear end in an extension forming a well, said inner receptacle having a foraminous covering plate with an upwardly rounding surface, said plate extending from the forward inner end of said inner receptacle to the rear end of said outer receptacle, and means for heating the bottom of said inner receptacle.

4. A snow melting apparatus comprising a main cart body, a snow receiving receptacle having the bottom inclined from the front to the rear end of the receptacle, a protecting screen plate located over said bottom, a depressed well at the rear end of said bottom formed by a short vertical wall and extended side walls of the receptacle, a valve controlled water outlet from said well, a heating means, a clean-out door in the rear wall of the receptacle to give access to the bottom of the said receptacle, and a clean-out door in the well.

5. A snow melting apparatus comprising a main outer receptacle or body, an inner snow receiving receptacle smaller than the outer receptacle, a screen protecting plate in the inner receptacle above the bottom thereof, a heating means carried by the main receptacle below the inner receptacle, and transporting wheels, a clean-out door giving access to the interior of the inner receptacle between the bottom thereof and the screen plate.

6. A snow melting apparatus comprising a main outer receptacle, an inner receptacle smaller than the outer receptacle and forming a depressed well at the rear of said inner receptacle, a heating means in the space between the two receptacles suitable air supply openings being formed in the main receptacle, and a door in the wall of the main outer receptacle giving access to the burner containing space.

This specification signed and witnessed this 18th day of April A. D. 1910.

CHRISTIAN EBERSTALLER.

Witnesses:
W. A. TOWNER, Jr.,
L. I. MAYER.